Feb. 13, 1951     R. C. MACHLER     2,541,877
SPECTROGRAPHIC LIGHT-SOURCE
Filed May 16, 1949     3 Sheets—Sheet 1
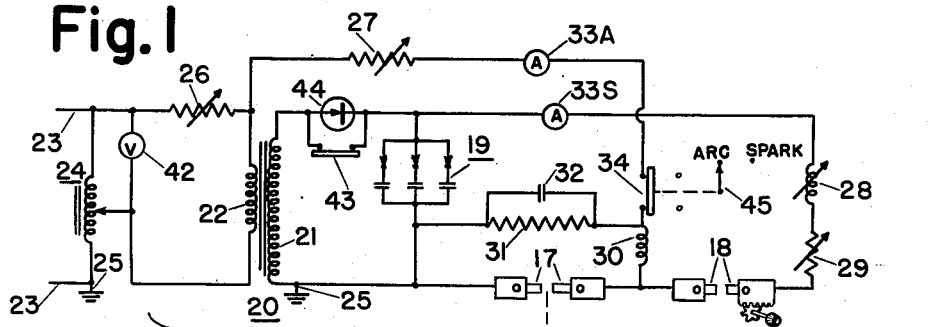
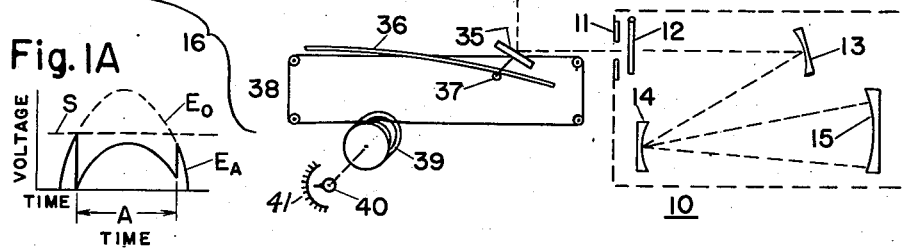
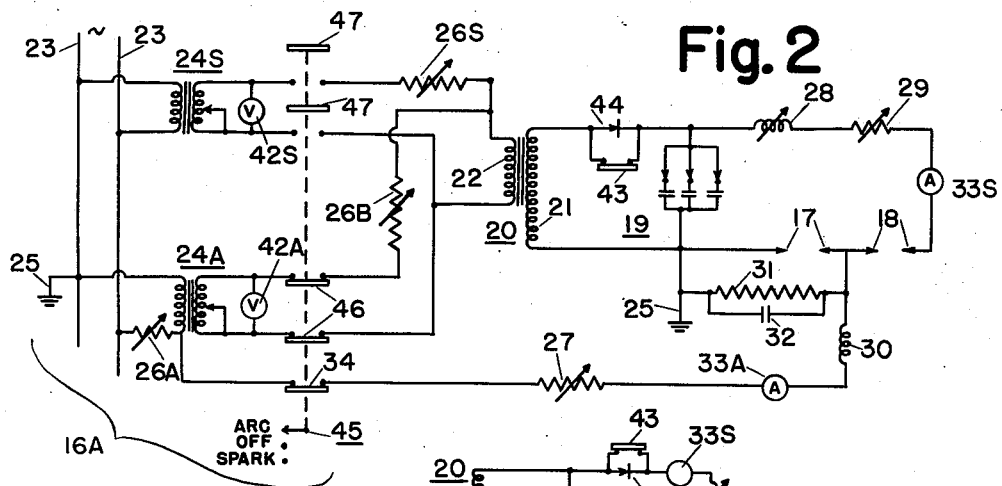
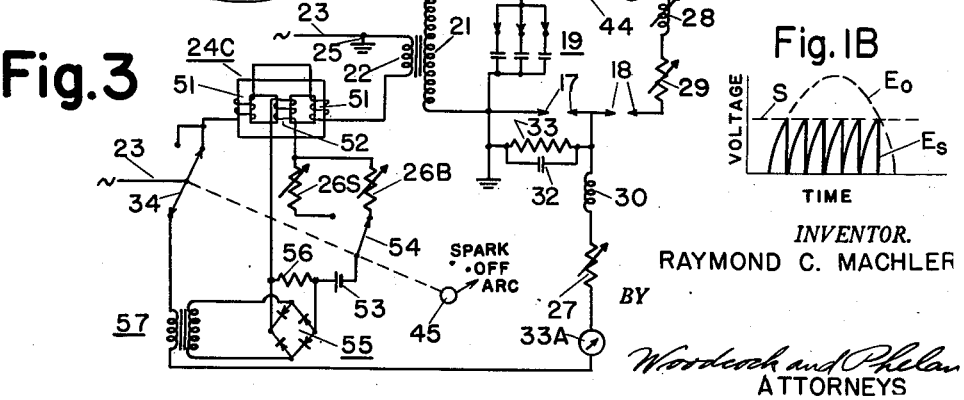
INVENTOR.
RAYMOND C. MACHLER
BY
Woodcock and Phelan
ATTORNEYS Feb. 13, 1951 R. C. MACHLER 2,541,877
SPECTROGRAPHIC LIGHT-SOURCE
Filed May 16, 1949 3 Sheets-Sheet 2
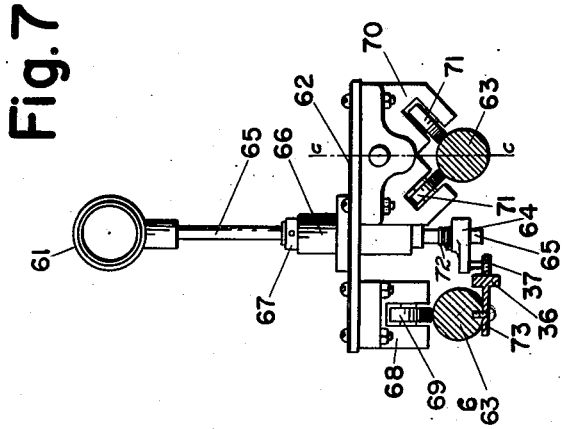
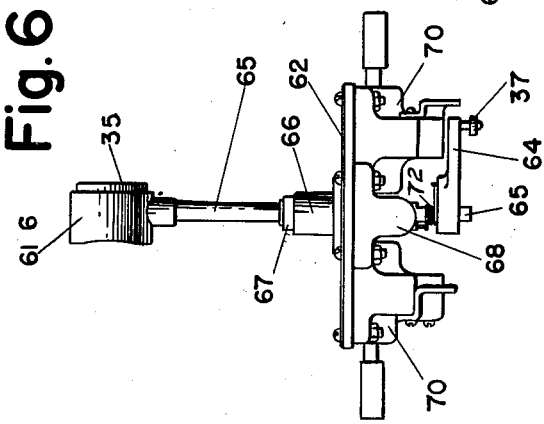
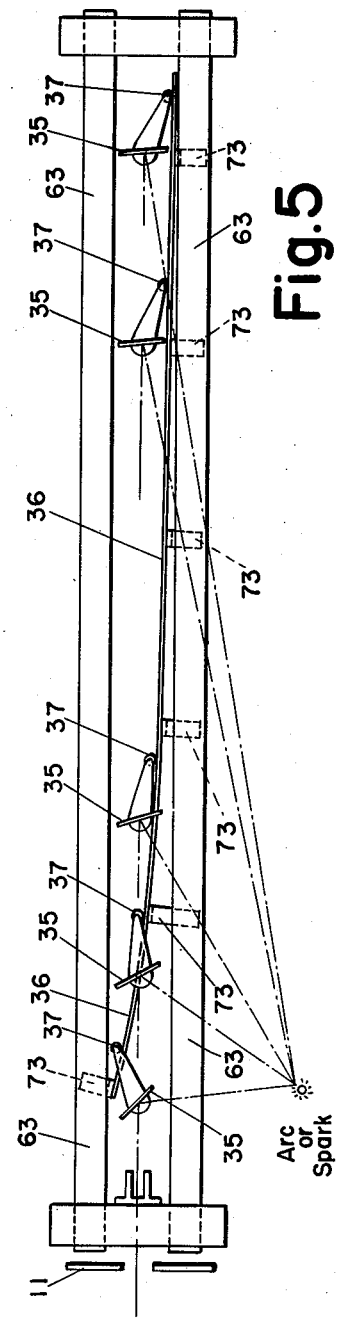
INVENTOR.
RAYMOND C. MACHLER
BY
*Woodcock and Phelan*
ATTORNEYS Feb. 13, 1951 — R. C. MACHLER — 2,541,877
SPECTROGRAPHIC LIGHT-SOURCE
Filed May 16, 1949 — 3 Sheets-Sheet 3

INVENTOR.
RAYMOND C. MACHLER
BY Woodcock and Phelan
ATTORNEYS

Patented Feb. 13, 1951

2,541,877

UNITED STATES PATENT OFFICE 2,541,877

SPECTROGRAPHIC LIGHT SOURCE

Raymond C. Machler, Philadelphia, Pa., assignor to Leeds and Northrup Company, Philadelphia, Pa., a corporation of Pennsylvania Application May 16, 1949, Serial No. 93,491

22 Claims. (Cl. 315—240)

This invention relates to systems for spectrochemical analysis in which an electric discharge between spaced electrodes of an analytical gap serves as the light-source.

For spectrochemical analysis of samples of various compositions including ferrous and nonferrous metals and their alloys, the spectrum should in some cases be produced by a spark discharge; in other cases by an arc discharge; and in many cases both the arc and spark spectra of a sample or specimen should be studied for a complete, accurate analysis. In general, spark analysis is used when the concentration of the alloying elements is of the order of 0.01% to 40% and is to be measured with precision of the order of 1% of the amount present, the high-voltage spark insuring uniform, random sampling of the electrode surfaces and freedom from the self-reversal of arc-lines: arc analysis is generally used for detection of "tramp" or "trace" elements whose concentration is within the range of from about one part in a thousand to one part in a million and is to be measured with precision of about 5%.

In arc analysis, the arc should be periodically initiated by a high-voltage, high-energy spark to insure proper sampling of the test specimen, but there should be no sparking during existence of the arc. For a particular analysis, the repetition rate of the discharge, if spark, or the duration of the discharge, if arc, and the energies in successive discharges should remain constant within narrow limits at values selected from ranges which are necessarily wide to meet the requirements of different analyses. Furthermore, the effective intensity of the spectrum produced by the arc or spark discharge must be adjustable to accommodate the widely different sensitivities of various recording or measuring devices and photographic emulsions used in spectrochemical analysis and such adjustment must not disturb the intensity or other operating characteristics of the discharge itself.

To meet these requirements, the light-source, in accordance with the present invention provides: for selection of a spark discharge or of an arc discharge with suppression of sparking after initiation of an arc; for selection of desired energy content of the spark or arc discharge; for selection of different repetition rates of a spark discharge or of different periods of duration of an arc discharge; and for adjustment of the optical distance between the analytical gap and the entrance slit of a spectrum-producing apparatus such as a spectrograph, spectrometer, spectrophotometer, or the like, generically herein termed a spectrograph, without disturbance of the configuration of the supply circuit for the gap.

More specifically and in preferred forms of the invention, the power input to a step-up transformer used for production of spark discharges in spark analysis or for periodic initiation of an arc in arc analysis is variable to control the number of sparks per cycle in spark analysis or the duration of the arc per cycle in arc analysis. For arc analysis, the heavy arc current is supplied directly from a relatively low-voltage power line and it is provided that during flow of arc current, the input to the spark circuit is automatically reduced to extent preventing further sparking after initiation and during continuance of the arc. Preferably, for routine testing, the circuit parameters suited for arc or spark analysis are preset, as are also the switching and timing sequences respectively proper for each type of analyses, so that an operator need only momentarily actuate a selected switch to initiate the cycle of operations required for an arc or spark analysis.

In accordance with another aspect of the invention, the effective intensity of the light-source, as viewed by the spectrograph, is varied by moving a mirror to decrease or increase the length of the optical path from the analytical gap to the entrance slit of the spectrograph, the angular position of the mirror being varied automatically with distance to maintain the virtual or real image of the discharge on the optical axis of the spectrograph.

The invention further resides in a spectrographic light-source having the features of construction, combination and arrangement hereinafter described and claimed.

For a more complete understanding of the invention and for illustration of various embodiments thereof, reference is made to the accompanying drawings in which:

Fig. 1 schematically represents a spectrograph and a light-source therefor, suited for arc and spark analyses;

Figs. 1A and 1B are explanatory figures of waveforms herein discussed;

Figs. 2 and 3 are modified forms of the light-source of Fig. 1;

Fig. 4 is a perspective view, in part showing a preferred embodiment of the light attenuator of Fig. 1;

Fig. 5 is a plan view of track and cam structure shown in Fig. 4 with the mirror of Fig. 4 shown in various positions;

Figs. 6 and 7 are front and side elevational views of parts appearing in Fig. 4.

Figure 8:
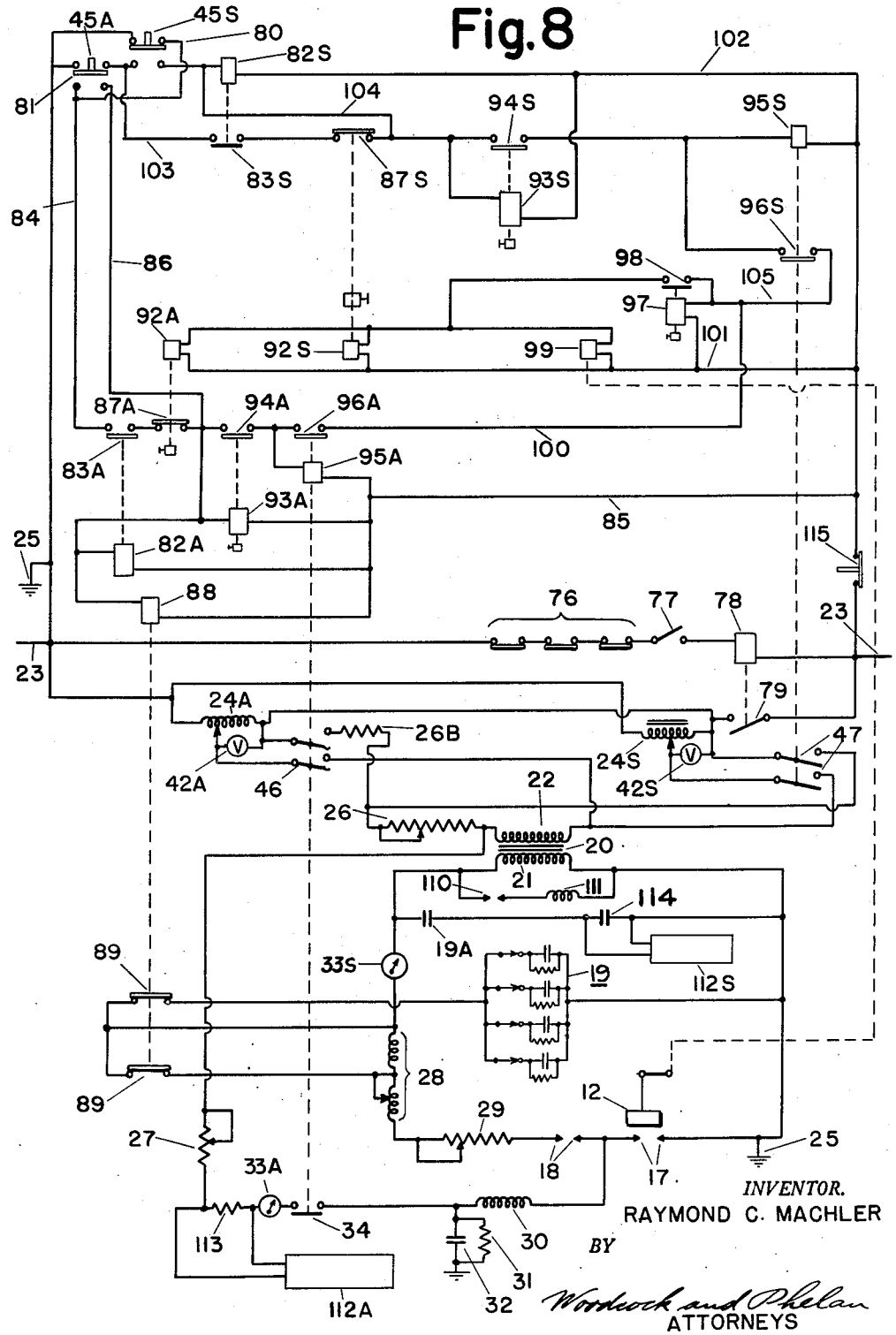
Fig. 8 is an across-the-line diagram of a dual light-source essentially similar to Figs. 1 to 3.

Referring to Fig. 1, the spectrograph 10, of any suitable type, is provided with entrance slit 11 for entry of radiation from a source later specifically described. For purposes of explanation, the spectrograph as represented in Fig. 1 is of the Wadsworth type. Assuming the shutter 12 associated with the slit 11 is open, the radiation passed by the slit is reflected by collimating mirror 12 onto a prism or grating 14 which produces a spectrum characteristic of the source of the radiation. The structure 15 is generically representative of a holder for positioning a photographic film or plate in the focal curve of the spectrograph or for supporting photoelectric cells positioned to view or scan one or more spectral lines as in copending applications Serial Nos. 662,531 and 729,272, now Patent No. 2,480,636. All elements shown in Fig. 1 as outside of the broken rectangle 10 are components of the light-source unit 16 for the spectrograph.

The arcs or sparks which provide the radiation to be analyzed by spectrograph 10 are produced between the electrodes 17, 17 of the analytical gap of the light source. For spectro-chemical analysis of a metal, or other conductor, specimens thereof are utilized as the electrodes 17, 17, the metallic vapors produced by the electric discharge having characteristic frequencies of emission and absorption. In brief, the intensities and frequencies of the spectral lines respectively quantitatively and qualitatively identify the components of the vapor in the analytical gap.

The electrodes 17, 17 of the analytical gap are in series with the electrodes 18, 18 of a control gap in the discharge circuit of a condenser 19 having several sections selectively included in circuit by switches or jumpers. The control gap formed by electrodes 18, 18 is preferably of the type, disclosed and claimed in Enns Patent No. 2,456,116, using an air blast to remove ionized particles from the gap in the interval between successive discharges. The condenser 19 is charged by current supplied from the high-voltage secondary winding 21 of a transformer 20 whose primary winding 22 may be energized from any suitable source, for example, a power line 23, 23 supplying 110 or 220 volts at 60 cycles. The primary or input circuit of the step-up transformer 20 includes a transformer, induction-regulator or other voltage-varying device generically represented by auto-transformer 24. The voltage selected for energizing the primary of transformer 20 can be read from voltmeter 42: For maximum primary voltage, the output or secondary voltage may be as high as about 35,000 volts, although the control gap is set to break down at a maximum of about 20,000 volts.

The circuit thus far described provides for charging of condenser 19 to high voltage and for discharge of the condenser through a path including the analytical gap. To obtain a high-energy spark, the condenser 19 is of high maximum capacity, for example, .016 microfarad, so requiring that transformer 20 be of substantial rating, as of the order of 3 kva. When the resistance of the analytical gap is broken down by a high-voltage spark, a heavy arc current, of the order of 5 amperes, flows across the gap from the supply line 23, 23 through a circuit including the ground connections 25, 25 and impedances 26, 27. The impedance 26 is also in series with the primary winding 22 of the step-up transformer 20 so that the additional voltage drop across this impedance produced by the heavy arc current reduces the voltage across the primary winding 22 of transformer 20 to such extent that the voltage of condenser 19 does not rise above the breakdown voltage of the control gap between electrodes 18, 18. Consequently, during the arc discharge which continues for the remainder of the half-cycle in which initiated, there is no sparking produced between the electrodes 17, 17, the discharge retaining its true arc nature. Furthermore, the initiating spark is a high-energy spark of extremely short duration so that in effect the nature of the discharge from start to finish is essentially arc-like. At the end of the half-cycle, when the arc current falls to zero, the additional voltage drop across impedance 26 disappears. In the subsequent half-cycle, condenser 19 is recharged until the control gap between electrodes 18, 18 again breaks down to initiate an arc.

The waveform $E_A$ of Fig. 1A is typical of the condenser voltage for spark-initiated arc operation. As shown, the voltage rises in a half-wave $E_0$ of the transformer output voltage (unloaded) until at point S, the control gap breaks down to discharge the condenser: In the interval A, the condenser voltage rises and falls with the transformer voltage but does not exceed the sparking value because for this interval arc current is flowing through impedance 26 for reduced input to transformer 20. When the arc current ceases to flow, the condenser voltage may again rise but to value below the sparking point because the half-wave of voltage $E_0$ is then low and approaching zero.

The settings of the voltage-selective device 24, of impedance 26, of capacitor 19, and of control gap 18, 18 determine the intensity of the initiating spark and the time in each half-cycle at which the arc is initiated. The setting of the impedance 27 traversed solely by the arc current determines, jointly with the setting of impedance 26, the magnitude of the arc current which may be read from ammeter 33A. The spark current may be read from ammeter 33S.

The adjustable inductance 28 and adjustable resistor 29 in the spark discharge circuit provide for selection of the waveform of the spark current. The spark discharge is essentially oscillatory, the inductance 28 affording duration of spark discharge sufficient to insure initiation of an arc in each discharge of the condenser and the resistance 29 affording a suitably high damping rate of the high-frequency oscillations.

Preferably and as shown, the analytical gap is shunted by a high resistance 31 of the magnitude of the order of 25,000 ohms. It is thus provided that during charging of condenser 19 the entire charging voltage is effectively applied to the control gap but because of the high magnitude of resistance 31, it has an insignificant effect upon the analytical gap current as traversed either by the spark or the arc discharge. The coil or winding 30, in series with the analytical gap in the arc-circuit in association with condenser 32, serves as a filter isolating the low-frequency power line 23, 23 from the high-frequency currents produced in the spark-discharge circuit.

The initiation of the arc by a high-voltage spark permits the analytical gap to be much longer than heretofore used in arc analysis: Specifically, the electrode spacing may be 4 millimeters. The substantially increased length of the gap not only affords a materially greater radiation source but is also less affected than prior short gaps by the incrustations on the opposed electrode faces resulting from the discharge.

Supply of the heavy arc current directly from the low-voltage line after initiation from the high-voltage spark circuit avoids need for expensive high-voltage and high-rating voltage-dropping resistors, the power losses incident to use thereof and the heavy load imposed upon air-conditioning equipment for removal from the laboratory or room of the heat generated by such resistors.

The arc produced between the electrodes 17, 17 of the analytical gap is directed by mirror 35 upon the slit 11 of the spectrograph 10 for analysis in accordance with known photographic or direct-reading techniques.

When a spark analysis is desired, the arc-circuit is broken, as by movement of contact 34 to open-circuit position, by a control knob 45 or equivalent. Under this circumstance, production of a spark across the analytical gap does not result in initiation of an arc: Instead, it is followed in the same half-cycle by a series of sparks of number dependent upon the settings of the voltage-control device 24, impedance 26 and control-gap electrodes 18, 18, all as more fully described in the aforesaid Enns patent. In general, as shown in Fig. 1B, the condenser voltage Es repeatedly rises to the sparking value S in a half-cycle of the transformer voltage.

It is unnecessary here further to discuss the factors determining whether an arc or spark discharge should be used for analysis in a particular case or the desirability of making both an arc and spark analysis of a given test specimen: The point significant is that the source 16 permits selective use of either a spark or arc discharge with flexible control over both types of discharge and with a minimum of system components and power losses.

The use of a high-voltage, high-intensity spark for initiation of the arc in arc analysis has several important advantages which include random sampling of the electrodes despite existence of oxidized areas and release of residual element vapors by the spark insuring these same vapors shall be present when the spark is immediately followed by a low voltage arc.

In photographic spectrochemical analysis, the various emulsions used are of substantially different sensitivities: likewise the various photocell and amplifier systems used for direct indication or recording of the intensities of spectral lines are of varying sensitivities. To accommodate the light source to these varying sensitivities of the measuring media or devices, it is not feasible to change the intensity of the discharge itself because this would affect the characteristics of the spectrum produced. The effective intensity of the discharge may be varied by moving the analytical gap closer to or farther from the entrance slit of the spectrograph but this is undesirable not only because requiring the use of flexible high-voltage leads or sliding contacts but also because the consequent change in configuration of the discharge circuit would require readjustment of its parameters and would change the electric and magnetic fields in the vicinity of the analytical gap and so alter its operating characteristics.

Instead, as shown diagrammatically in Fig. 1, and more fully in Figs. 5 and 7, the optical path from the analytical gap to the entrance slit 11 of the spectrograph may be increased or decreased by adjustment of mirror 35 which reflects radiation from the gap into the spectrograph. In the preferred construction shown, the mirror is mounted on a carriage coupled as by cord 38 and drum 39 to a control knob 40 associated with a calibrated index and scale arrangement 41. For rectilinear movement of mirror in one direction, the distances from it to the analytical gap and to the entrance slit are concurrently lengthened whereas for reverse movement those distances are concurrently shortened. The mirror is pivotally mounted upon its carriage and rigidly coupled to a cam follower 37 maintained continuously in engagement with a stationary cam 36 so shaped that for each position of the mirror carriage, the mirror angle is that required to direct the radiation from the analytical gap along the optical axis of the spectrograph. In brief, as the mirror 35 is moved to vary the optical distance between the analytical gap and the entrance slit, it is concurrently rotated to maintain the gap, the slit and the first optical element of the spectrograph in optical alignment.

In routine testing of specimens of both spark and arc analyses, it would be necessary with the simplified arrangement of Fig. 1 to change the adjustments of the voltage-selecting device 24 and of the series impedance 26. However, with the arrangement shown in Fig. 2, the transformer input voltage and the impedance in series with the transformer primary may be preset for both spark and arc analyses and the transition from one to the other type of analysis effected concurrently with actuation of the "arc-spark" switch 34 or equivalent. More specifically, when the selector 45 is in the "arc" position, the movable contacts 46 are in closed-circuit position: The primary of the step-up transformer 20 is thus energized from a supply circuit including the voltage-varying device 24A which may be an auto-transformer, as in Fig. 1, or an isolating transformer, as in Fig. 2. The time of spark-initiation of an arc in a half-wave of the supply voltage depends upon the setting of the voltage-control device 24A, the control gap setting, the selected magnitude of capacitor 19 and upon the magnitude of impedance effectively in series with the primary winding of the step-up transformer. The series impedance may be lumped in the single variable resistor 26A or may in part comprise the variable resistor 26B. After initiation of the arc, heavy arc current flows through the series resistance 26A common to the arc and spark supply circuits so to reduce, as in Fig. 1, the input voltage of transformer 20 to a value insuring non-production of sparks in the analytical gap during flow of the arc current.

With the control knob 45 in the "spark" position, the contacts 34 and 46 are in open circuit position to disconnect the analytical gap from the power line 23 and to disconnect the transformer 20 from the circuit components preset for arc operation. The movement of control member 45 to "spark" position also effects closure of contacts 47, 47 to connect the transformer 20 for energization in an input circuit including impedance 26S and voltage-varying device 24S which may be preset for spark operation. In other respects, the light source of Fig. 2 is similar to that of Fig. 1 and further description thereof appears unnecessary.

Another arrangement for reducing the input to the step-up transformer after initiation of an arc by a spark is shown in Fig. 3. With the control knob 45 in the "arc" position, the primary winding 22 of transformer 20 is in circuit with the load coils 51 of a saturable core reactor 24C whose control winding 52 is energized with direct current of magnitude determined by the setting of the resistor 26B then included by movable contact 54 in circuit with a source of direct current generically represented by battery 53. Upon initiation of an arc, the rectifier 55, coupled to the arc-circuit as by transformer 57, provides across the resistance 56, in circuit with control winding 52, a voltage which opposes that of battery 53 so reducing the unidirectional current in control winding 52 and effectively increasing the reactance in series with input circuit of transformer 20. The input to the transformer 20 is thus reduced to non-sparking magnitude without recourse to a series impedance common to the arc and spark supply circuits as in Figs. 1 and 2.

For use of the dual-light source of Fig. 3 for production of a spark discharge in the analytical gap, the control knob 45 is moved to the "spark" position thus to interrupt the arc-circuit by opening of contact 34 and to apply a different input voltage to transformer 20 by movement of contact 54 to include a second adjustably preset resistor 26S in circuit with the control winding 52 of the saturable core reactor 24C.

If the arc-circuit itself includes a rectifier for production of a direct-current arc, some times used in arc analysis, resistor 56 may be included in the arc-circuit with omission of transformer 57 and rectifier 55. In other respects the system of Fig. 3 is similar to that of Fig. 1 and further description appears unnecessary.

In each of Figs. 1 to 3, the condenser-charging circuit may include a high-voltage rectifier 44 for production of direct-current sparks: for production of alternating-current sparks, the rectifier is omitted or shorted out of circuit as by contact 43.

In all of the systems herein shown, the effective intensity of the discharge, as impressed upon the entrance slit of the spectrograph, may be varied by changing the optical distance between the analytical gap and the entrance slit as briefly described in connection with Fig. 1. For a more detailed showing of a preferred arrangement for variably attenuating the spectrum to be analyzed, reference is now made to Figs. 4 to 7.

The mirror 35 is mounted in a tubular holder 61 rotatably supported by a carriage 62 accurately guided for rectilinear motion by a track formed of parallel bars 63, 63. The mirror holder 61 and its actuating arm 64 are attached to the upper and lower ends respectively of a shaft 65 which passes through a bearing 66 extending through carriage 62 in direction normal to the direction of carriage movement. Collars 67, 67, secured to shaft 65, engage the ends of the bearing member 66 to serve as thrust washers and accurately to maintain a fixed vertical distance between the track and the center line of the mirror. The biasing spring 72, whose ends engage pins respectively mounted upon carriage 62 and arm 64, maintains constant engagement between the cam follower 37 attached to arm 64 and the cam 36 which may be attached as by brackets 73 to the track members 63. The cam 36 is so shaped that for all positions of the carriage along the track, the angular position of the mirror about the axis of shaft 65 is always that required for viewing of the gap discharge by the entrance slit 11 of the spectrograph.

Smooth motion of the mirror carriage along the track without transverse displacement of the mirror holder is obtained without recourse to expensive V-blocks or guides. As shown, one of the circular bars 63 is engaged by a roller 69 supported in a bearing block 68 attached to the under face of carriage 62. The periphery of roller 69 has a point-line engagement with the topmost part of the surface of the associated rod 63. The other rod 63 is engaged by two pairs of rollers 71, 71. Each pair of rollers 71, 71 is mounted in block 70 attached to the under side of carriage 62 with the axes of rotation of the individual rollers intersecting above the bar. Thus, one pair of rollers 71, 71 spaced lengthwise of the track has point-line contact with bar 63 to the right of a vertical center line C—C and the other pair of rollers 71, 71 has point-line contact with the bar 63 to the left of that center line.

With the construction described, the carriage 62 may be adjusted along the track with assurance that the vertical center-line of the mirror remains in alignment with the entrance slit of the spectograph, that the angular position of the mirror is always correct for reflection from the source to the slit and that the length of the optical path from the source to the slit accurately corresponds with the indications of dial-index 41.

As will appear from the following description thereof, the dual light-source shown in Fig. 8 is fundamentally similar to that of Figs. 1 to 3 with addition of circuit components insuring proper sequence and timing of the steps of a fully automatic cycle of arc or spark analysis, either of which may be selectively initiated by an operator. System components having the same purpose as components of Figs. 1 to 3 are identified by the same reference characters, in some instances with subscript.

Assuming the safety or door switches 76 of the unit are closed, the unit is put in operation by closure of switch 77 to effect energization of contactor 78 from the supply line 23, 23. The closure of contact 79 of contactor 78 effects energization of auto-transformers 24A and 24S from the power source but the spark transformer 20 remains de-energized from both supply circuits because contacts 46 and 47 respectively in circuit with the output windings of the auto-transformers remain open. An arc-analysis cycle or a spark-analysis cycle may now be selectively initiated by momentary depression of a corresponding control button 45A or 45S which are biased to the positions shown in Fig. 8 and jointly serve as an "arc-spark" selector switch.

Assuming it is desired to use the unit as an arc-analysis source, the button 45A is momentarily depressed to start an automatic cycle during which the analytical gap is operated for a predetermined time sufficient for stabilization of the spectral line composition of the arc followed by a predetermined interval of admission of radiation from the arc to the spectrograph.

The movement of contact 81 of the "arc" switch 45A to its lower circuit closing position effects energization of relays 82A, 88 and 93A through a circuit which can be traced through contact 89 of the "spark" switch 45S and contact 81 of the "arc" switch 45A, respectively in upper and lower circuit-closing positions, conductor 86, the parallel-connected coils of relays 82A 88, 93A and conductor 85.

The opening of contacts 89 of relay 88 changes, by predetermined amount, the effective value of inductance 28 in the spark-discharge circuit and connects across the charging circuit a preselected number of sections of capacitor 19. In general, for arc analysis, less capacity and more inductance is used than for spark analysis.

The closure of contact 83A of relay 82A completes a seal-in circuit for the "arc" switch 45A through conductor 86, the normally closed contact 87A of the time-delay, shut-off relay 92A, contact 83A of relay 82A and conductor 84. The "arc" selector switch 45A may now be released by the operator and the cycle will proceed to completion as now further described. The contact 94A of time-delay relay 93A closes after a predetermined interval to energize the "arc-power" relay 95A, the delay time, about two seconds or so, insuring the long-stroke high-voltage contact 89 has completed its movement before excitation of transformer 20. The closure of contacts 46 of relay 95A connects the primary of the step-up transformer 20 to the output circuit of the "arc" auto-transformer 24A preset to apply a selected voltage. The closure of contact 34 of relay 95A connects the analytical gap to the power line 23, 23 in readiness for supply of arc current after spark-initiation of an arc, as discussed in connection with Figs. 1 to 3. The arc-circuit includes resistors 26 and 26B, common to the arc-input circuit of transformer 20, to reduce the input thereof during flow of arc current as discussed in connection with Figs. 1 and 2. The closure of contact 96A of relay 95A energizes through a circuit including conductors 100—101 the time-delay relay 97 preset to afford the desired "pre-burn" period of the now operating analytical gap.

After a predetermined short interval afforded by time-delay relay 97, the contact 98 of relay 97 closes to energize the solenoid 99 and the time-delay "shut-off" relay 92A; time-delay relay 92S is also energized but performs no function in the "arc" analysis cycle.

The shutter 12 is actuated to open position by solenoid 99 to permit radiation from the analytical gap to form a spectrum within spectrograph 10, Fig. 1, for recording or measurement purposes, as discussed in connection with Fig. 1, the effective intensity of the spectrum being determined by the setting of the mirror 35, Figs. 1 and 4 to 6. The duration of the period for which the shutter is opened is predetermined by the setting of the time-delay relay 92A. Upon expiration of the preselected exposure period, the contact 87A of relay 92A automatically opens to deenergize all relays and so complete the arc-analysis cycle.

To initiate the proper sequence of operations for a spark analysis, the operator momentarily depresses the "spark" button 45S. This effects energization of relays 82S, 93S through a circuit which can be traced through selector contacts 81 and 80 respectively in upper and lower circuit-closing positions, the parallel connected coils of relays 82S, 93S, and the conductor 102.

The closure of contact 83S of relay 82S completes a seal-in circuit for the spark-switch 45S through conductor 103, contact 83S, the normally closed contact 87S of time-delay, shut-off relay 92S and conductor 104. The spark-control button 45S may now be released and the spark-analysis cycle so initiated will continue to completion.

After a short interval, the contact 94S of relay 93S closes to energize the "spark-power" relay 95S. The time-delay relay 93S is for circuit-protection: If when the unit is on "arc" operation the spark selector 45S is depressed, there is sufficient time for the "arc" power relay 95A and the associated auxiliary relays to open before the "spark" power relay 95S closes. Similarly, the time-delay relay 93A is for protection in event the "arc" selector 45A is depressed while the unit is energized for "spark" operation. These time-delay relays as well as the others of the unit may be of any suitable type, for example, the electromagnetic type using dash-pots or delay coils, or of the thermal type, or of the motor type.

Reverting to description of the spark-operation cycle, the closure of contacts 47 of relay 95S connects the primary of spark-transformer 20 to the output terminals of auto-transformer 24S, or equivalent, preset to deliver the desired voltage for spark analysis.

The concurrent closure of contact 96S of relay 95S effects energization of the time-delay relay 97 through a circuit including conductors 105 and 101. After a predetermined "pre-burn" time, sufficient for stabilization of the spark spectrum, the contact 98 of relay 97 closes to energize the shutter solenoid 99 and the time-delay, shut-off relay 92S; the time-delay relay 92A is also energized but performs no function in the spark-analysis cycle. The shutter 12 remains open to allow radiation from the analytical gap to produce a spark spectrum in spectrograph 10 for a period determined by the setting of the time-delay relay 92S. At the end of that period, the contact 87S of relay 92S opens to deenergize all relays, so to complete the spark-analysis cycle.

Thus, with the dual light-source of Fig. 8, an operator need merely depress a selected control-button 45A or 45S to initiate the cycle of operations affording either a spark-analysis or an arc-analysis cycle. This is of distinct advantage in routine testing as performed on a twenty-four hour basis in large industrial plants, for example. In such cases, the various adjustments of the light-source for both types of operation are made by a skilled technician and need not be changed by the operator doing the routine analysis. The dual light-source of Fig. 8 also has the flexibility required to perform laboratory analyses on various compositions requiring widely different circuit parameters to obtain spectra containing the best available information.

To complete the description of Fig. 8, mention is made of auxiliary components desirably used but not shown in the simpler schematic arrangements of Figs. 1 to 3. Preferably, there is provided a safety gap 110 in series with a high-frequency choke coil 111 directly across the secondary winding 21 of the high-voltage transformer 20: This gap is so set that it will break down before the transformer secondary voltage reaches a value dangerous to the capacitor 19. The waveform of the voltage across condenser 19 may be examined by oscilloscope 112S connected across a large capacity condenser 114 connected in series with section 19A of condenser 19 which is in circuit both for "arc" and "spark" operation of the unit: The waveform of the arc current may be examined by oscilloscope 112A connected across resistor 113. A single oscilloscope may, of course, be used with provision for switching input leads from condenser 114 to resistor 113 in the "arc" circuit. The adjustment of the contacts of auto-transformers 24A, 24S may be effected by reversible motors controlled by switches mounted on the housing for the light-source. Indicator lamps may also be mounted on a panel of the housing to show whether or not the unit is in readiness for operation, which, if either, type of analysis is being performed, and the progressive stages of the selected type of analysis. Such lamps may respectively be connected in shunt to contactor 78, relays 82A, 82S, 95A, 95S, 97 and solenoid 99. The "stop" switch 115 may be provided for interruption of either the "arc" cycle or the "spark" cycle at any stage after initiation by the selector 45A, 45S.

It shall be understood the invention is not limited to the specific arrangements described for purposes of illustration and that changes may be made within the scope of the appended claims.

What is claimed is:

1. A light-source for spectrochemical analysis comprising an analytical gap, a high-voltage capacitor having said gap in its discharge circuit, a high-voltage charging circuit energizable from a low-voltage low-frequency supply source to produce sparking at said gap, an arc-circuit including connections extending from said low-voltage source to said gap completed upon breakdown of the gap by a spark, input-control means for said charging circuit preset to determine the time of initiation of an arc by a spark in a cycle of said supply source, and electrical means responsive to flow of arc current for reducing the input to said charging circuit to preclude sparking in the arc after its initiation.

2. A light-source as in claim 1 including impedance means in said low-voltage arc-circuit preset to determine the magnitude of the arc-current.

3. An arc-spark light-source for spectrochemical analysis comprising an analytical gap, a high-voltage capacitor having said gap in its discharge circuit, a high-voltage charging circuit for said high-voltage capacitor energizable from a low-voltage low-frequency supply source to produce spark discharges at said gap, an arc circuit including connections extending from said low-voltage source to said gap completed upon breakdown of the gap by a spark, input-control means for predetermining the rate of rise of voltage in said charging circuit, and switching means selectively operable to break or make said arc-circuit respectively for spark analysis or arc analysis, said rate-predetermining means in the former case determining the repetition rate of the spark and in the latter case determining the duration of the arc per cycle of said source.

4. A light-source as in claim 3 in which the rate-predetermining means comprises two voltage-varying devices respectively preset for predetermined spark repetition rate per cycle of said source and arc duration per cycle of said source and selected by said switching means for supplying energy to said high-voltage charging circuit.

5. A light-source as in claim 3 additionally including means responsive to flow of arc current for reducing the input to said charging circuit to magnitude insufficient to produce sparking during existence of the arc.

6. A light-source for spectrochemical analysis comprising a high-voltage charging circuit energizable from a low-voltage low-frequency source and including a capacitor, a spark-discharge circuit for said capacitor including in series an analytical gap and a control gap, and a low-voltage, high-current arc-circuit from said low-voltage source to said analytical gap completed upon spark breakdown of said gaps.

7. A light-source as in claim 6 including input-varying means for said charging circuit preset to predetermine the duration per cycle of said source of the spark-initiated arc and current-varying means in said arc-circuit preset to determine the magnitude of the arc current.

8. An arc-spark light-source for a spectrograph comprising a high-voltage circuit energizable from a low-voltage low-frequency supply line and including capacitance charged to sparking voltage, a spark-discharge circuit for said capacitance including in series an analytical gap and inductance, and a selector operable to one position to connect said gap to said supply line for supply of current to arcs across said gap initiated by high-voltage discharges at said gap and to select preadjusted magnitudes of said capacitance and inductance suited for spark-initiation of an arc source and operable to a second position to disconnect said gap from said supply line and to select other preadjusted magnitudes of said capacitance and inductance suited for a spark source.

9. An arc-spark light-source for spectrochemical analysis comprising an analytical gap, means including a step-up transformer energizable from a low-voltage low-frequency source for producing sparks across said gap, a circuit for applying low-voltage from said source to said gap there to maintain an arc upon breakdown of the gap by a spark produced by said spark-producing means, and electrical means affected by the arc current and in circuit with said transformer to prevent the production of a spark by said spark-producing means at said gap during flow of arc current.

10. A light-source as in claim 9 in which the electrical means is resistance traversed both by the arc current and by input current of the transformer.

11. A light-source as in claim 9 provided with selector switch means for making or breaking the arc-current circuit respectively for arc analysis or for spark analysis.

12. An arc-spark light-source for a spectrograph comprising an analytical gap, a high-voltage charging circuit energizable from a low-voltage low-frequency source to produce sparks at said gap, a selector switch operable to one position to connect said gap to said low-voltage source to supply current to an arc initiated by a spark and to a second position for disconnecting said gap from said supply source for production only of sparks, and a reflector angularly and linearly movable with respect to said gap and the entrance slit of the spectrograph effectively to vary the intensity of arc or spark radiation from the gap to said spectrograph.

13. A light-source for a spectrograph comprising an analytical gap having a fixed position, means for producing at said gap an electrical discharge of radiation characteristics determined by the composition of specimen vapor resulting from electric discharge between the electrodes of said gap, and calibrated means for varying the intensity of the radiation at the entrance slit of the spectrograph comprising a movable reflector for reflecting radiation from said discharge into the spectrograph, track structure for defining the path of linear movement of said reflector with respect to said gap and slit, and cam structure controlling angular movement of said reflector to maintain optical alignment of said gap and spectrograph.

14. An arc-spark light-source for spectrographic analysis comprising a high-voltage step-up transformer, a high-voltage capacitance means in the output circuit of said transformer, a discharge circuit for said capacitance including an analytical gap, an inductance means, a first supply-circuit for said transformer including voltage-control means and impedance means preset for arc analysis, a second supply-circuit for said transformer including voltage-control means and impedance means preset for spark analysis, relay means energizable selectively to connect said transformer to a low-voltage supply source through one or the other of said supply circuits, relay means for selectively connecting said gap to or disconnecting said gap from said low-voltage source respectively for arc and spark operation of said gap, relay means for varying said capacitance and inductance means to and from preset magnitudes respectively selected for arc and spark operation of said gap, and switching means manually operable selectively to energize one or another combination of aforesaid several relay means for arc or spark operation.

15. A light-source as in claim 14 including means responsive to flow of arc current for automatically reducing the input to said transformer in avoidance of sparking in arcs initiated in the gap by spark discharges.

16. A light-source as in claim 14 in which a seal-in relay maintains energization of that combination of relay means selected by a momentary actuation of said switching means and a time-delay relay effects deenergization of said selected combination of relay means to end a cycle of operation of said source.

17. A light-source as in claim 14 in which a time-delay relay delays operation of said first-named relay means until after operation of said third-named relay means in avoidance of erratic operation of said gap.

18. A light-source as in claim 14 in which a time-delay relay controls actuation of the spectrograph shutter to afford a predetermined "preburn" time of the analytical gap.

19. A light-source as in claim 14 in which time-delay relay means provides a preliminary "preburn" period of operation of the analytical gap and a subsequent predetermined period of opening of the shutter of the spectrograph.

20. A light-source as in claim 14 in which a seal-in relay maintains energization of that combination of relay means selected by momentary actuation of said switching means and in which time-delay relay means provides a preliminary "preburn" period of operation of the analytical gap and a subsequent predetermined period of opening of the shutter of the spectrograph terminating with deenergization of said selected combination of relay means to end a cycle of operation of said source.

21. A light-source for spectrochemical analysis comprising a high-voltage capacitor, means for charging said capacitor including voltage step-up means energized from a low-voltage, low-frequency source, a spark-discharge path for said capacitor including an analytical gap for a specimen to be analyzed, connections from said low-voltage, low-frequency source to said analytical gap for flow of arc-current directly from said source across said gap upon its breakdown by spark-discharge of said capacitor, and electrical means traversed by the arc-current after discharge of said capacitor across said gap for reducing the input from said source to said voltage step-up means to preclude sparking in the arc so initiated.

22. A light-source as defined in claim 21 in which the voltage step-up means is a low frequency transformer and in which the last-named means is resistance in series with the primary of said transformer for traverse by low-frequency current thereto and in series with said gap for traverse by low-frequency arc-current.

RAYMOND C. MACHLER.

REFERENCES CITED

The following references are of record in the file of this patent:

UNITED STATES PATENTS

| Number | Name | Date |
|---|---|---|
| 1,298,726 | Jackson | Apr. 1, 1919 |
| 1,478,638 | Cordes | Dec. 25, 1923 |
| 2,074,930 | Marx | Mar. 23, 1937 |
| 2,391,225 | Clark | Dec. 18, 1945 |
| 2,417,489 | Hasler et al. | Mar. 18, 1947 |